US012609730B2

(12) United States Patent
Yakovlev et al.

(10) Patent No.: US 12,609,730 B2
(45) Date of Patent: Apr. 21, 2026

(54) METHOD AND APPARATUS FOR EFFICIENT COMMUNICATION WITH IMPLANTABLE DEVICES

(71) Applicant: The Board of Trustees of The Leland Stanford Junior University, Palo Alto, CA (US)

(72) Inventors: Anatoly Anatolievich Yakovlev, Mountain View, CA (US); Daniel Pivonka, Palo Alto, CA (US); Ada Poon, Redwood City, CA (US); Teresa H. Meng, Saratoga, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 18/747,015

(22) Filed: Jun. 18, 2024

(65) Prior Publication Data

US 2025/0158657 A1    May 15, 2025

Related U.S. Application Data

(63) Continuation of application No. 17/893,281, filed on Aug. 23, 2022, now Pat. No. 12,040,848, which is a
(Continued)

(51) Int. Cl.
| | |
|---|---|
| *H04L 27/00* | (2006.01) |
| *H04B 5/45* | (2024.01) |
| *H04B 5/79* | (2024.01) |

(52) U.S. Cl.
CPC ................. *H04B 5/79* (2024.01); *H04B 5/45* (2024.01); *Y02D 30/70* (2020.08)

(58) Field of Classification Search
CPC .... H04B 5/0037; H04B 5/00; H04B 1/71637; H04B 1/719; G01S 13/0209; H01Q 9/005;
(Continued)

(56) References Cited

U.S. PATENT DOCUMENTS

| | | | |
|---|---|---|---|
| 2005/0187594 A1* | 8/2005 | Hatlestad ............. | A61N 1/3787 607/33 |
| 2007/0123946 A1* | 5/2007 | Masoud ............. | A61N 1/37276 607/32 |

(Continued)

*Primary Examiner* — Zewdu A Kassa
(74) *Attorney, Agent, or Firm* — Pillsbury Winthrop Shaw Pittman LLP

(57) ABSTRACT

Described herein are methods of making and using and apparatus for wirelessly communicating data and providing power, particularly from a location exterior to a body and to an implantable device disposed within a body with tissue. The described embodiments provide apparatus and methods for efficiently transfer data and power between an external transceiver and an (implanted) biomedical device. The method is to modulate power carrier, which wirelessly powers the device, using an asynchronous modulation scheme, such as amplitude shift keying (ASK) modulation, with minimal modulation depth in order to not disrupt the power flow. The digital data is encoded in the pulse width, eliminating the need for synchronization to the power carrier signal and further minimizing the power consumption necessary for data transfer. Additionally, a reverse backscatter method for obtaining data from the implant is described that has flexible, low power operation.

11 Claims, 11 Drawing Sheets

Related U.S. Application Data continuation of application No. 17/317,148, filed on May 11, 2021, now Pat. No. 11,451,265, which is a continuation of application No. 16/530,639, filed on Aug. 2, 2019, now Pat. No. 11,018,721, which is a continuation of application No. 15/721,276, filed on Sep. 29, 2017, now Pat. No. 10,411,760, which is a continuation of application No. 13/734,772, filed on Jan. 4, 2013, now abandoned.

(60) Provisional application No. 61/582,980, filed on Jan. 4, 2012.

(58) Field of Classification Search
CPC ......... H01Q 13/08; H04L 27/00; H04L 27/04; H04L 27/2602; H04L 27/361; H03F 3/24
USPC ................................. 375/256, 219, 316, 295
See application file for complete search history.

(56) References Cited

U.S. PATENT DOCUMENTS

| | | | |
|---|---|---|---|
| 2008/0183227 A1* | 7/2008 | Sutton | A61N 1/37276 607/60 |
| 2012/0093245 A1* | 4/2012 | Makdissi | A61B 5/0028 375/259 |

* cited by examiner

100

ASK-PW Modulator $$V_{rf}(t) = V_{rf+} - V_{rf-} = A[1 + k_a m(t)]cos(w_o t)$$     Modulation Depth = $|k_a m(t)| \leq 1.0$

METHOD AND APPARATUS FOR EFFICIENT COMMUNICATION WITH IMPLANTABLE DEVICES

CROSS-REFERENCE TO RELATED APPLICATIONS

This application is a continuation of U.S. patent application Ser. No. 17/893,281, filed Aug. 23, 2022, which is a continuation of U.S. patent application Ser. No. 17/317,148, filed May 11, 2021, now U.S. Pat. No. 11,451,265, which is a continuation of U.S. patent application Ser. No. 16/530, 639, filed Aug. 2, 2019, now U.S. Pat. No. 11,018,721, which is a continuation of U.S. patent application Ser. No. 15/721,276, filed Sep. 29, 2017, now U.S. Pat. No. 10,411, 760, which is a continuation of U.S. patent application Ser. No. 13/734,772, filed Jan. 4, 2013, which claims the benefit of U.S. Provisional Patent Application Ser. No. 61/582,980 filed Jan. 4, 2012, all of which are hereby incorporated in their entirety by reference.

FIELD OF THE ART

The embodiments described herein relate to methods of making and using and apparatus for wirelessly communicating data and providing power, particularly from a location exterior to a body and to an implantable device disposed within a body with tissue.

BACKGROUND

Implantable devices are known. Most use a battery internally disposed within the device from which to obtain power. Such devices requiring a battery that cannot draw additional power, however, are bulky and as such have limitations associated with them.

There are also known methods for wirelessly delivering power to an implantable device that have been proposed. One such discussion is provided in the patent application entitled "Method of Making and Using and Apparatus for a Locomotive Micro-Implant Using Active Electromagnetic Propulsion" filed as U.S. patent application Ser. No. 12/485, 654 on Jun. 16, 2009, which application is expressly incorporated by reference herein, and priority claimed thereto.

There are also communication systems known to allow transmission of data from the exterior of a body into the implantable device, as well as allow transmission of data along the reverse link from the implantable device to the exterior of the body, which systems all have limitations.

SUMMARY

Described herein are methods of making and using and apparatus for wirelessly communicating data and providing power, particularly from a location exterior to a body and to an implantable device disposed within a body with tissue.

The described embodiments provide apparatus and methods for efficiently transfer data and power between an external transceiver and an (implanted) biomedical device. The method is to modulate power carrier, which wirelessly powers the device, using an asynchronous modulation scheme, such as amplitude shift keying (ASK) modulation, with minimal modulation depth in order to not disrupt the power flow. The digital data is encoded in the pulse width (PW), eliminating the need for synchronization to the carrier signal and further minimizing the power consumption necessary for data transfer.

The combination of data and power in a single signal with ASK+PW modulation for data transfer to biomedical implantable devices also allows for an adjustable data rate by changing integrator gain or time constant. Additionally, the methods and apparatus described provide a large amount of flexibility for data transfer, and can operate under a variety of conditions.

BRIEF DESCRIPTION OF THE DRAWINGS

These and other aspects and features will become apparent to those of ordinary skill in the art upon review of the following description of specific embodiments of the invention in conjunction with the accompanying figures, wherein.

DETAILED DESCRIPTION OF THE PREFERRED EMBODIMENTS

The available power is very limited in autonomous implantable devices. This imposes strict limits on power budget of the transceiver components. Decoding data without synchronizing to the carrier signal could greatly reduce the power requirements of the transceiver components. Amplitude shift keying (ASK) modulation in conjunction with pulse width (PW) modulation encoding can be decoded without carrier synchronization and allows for simple, yet efficient and robust way to transfer data to an implantable device by directly modulating the carrier used to power the device. The demodulation of the data stream is simple and efficient compared to ASK or other modulation techniques that require synchronization, primarily because synchronization circuitry usually consists of phase or delay lock-loops, which can be complex and consume much power. By encoding the digital "0" and "1" bits with different pulse width, the demodulator is able to discriminate by comparing the transmitted energy in the bit. Furthermore, each bit contains both a transition from high to low and low to high in amplitude, which allows for digital clock recovery without the need for synchronization. This clock can be used to latch-in the received data and drive digital circuitry on chip.

The key advantage of this modulation technique is the efficiency of the data receiver and elimination of the need for synchronization circuitry. The power flow can also have minimum perturbations by choosing low modulation depth, as opposed to on-off keying (OOK) modulation. It has a very flexible data rate defined by the transmitter, and operates robustly as link gain and other environmental factors change, making it ideal for biomedical systems.

Figure 1A:
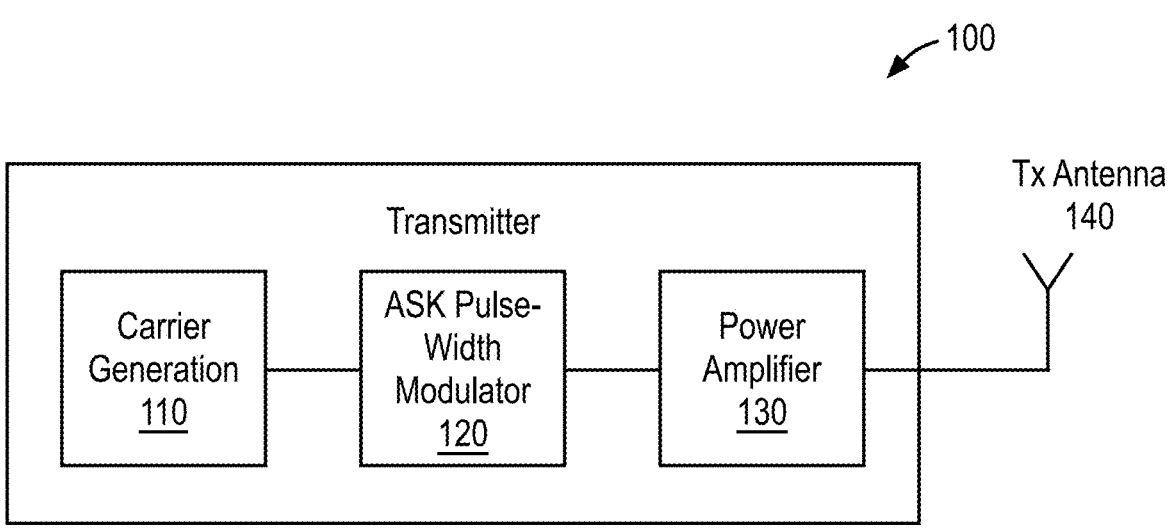
FIG. 1*a* illustrates a high level diagram of an external transmitter according to one embodiment.
Figure 1B:
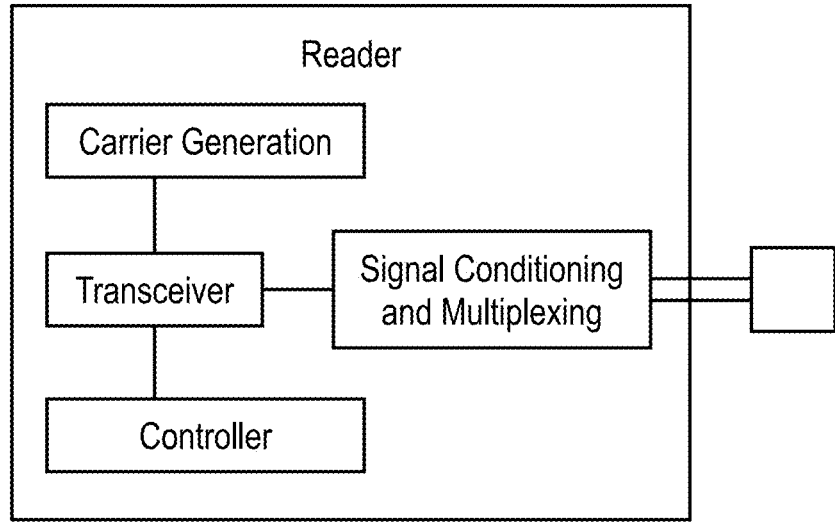
FIG. 1*b* illustrates a high level diagram of an external transmitter that incorporates a reader for the receiving data from the device
Figure 2A:
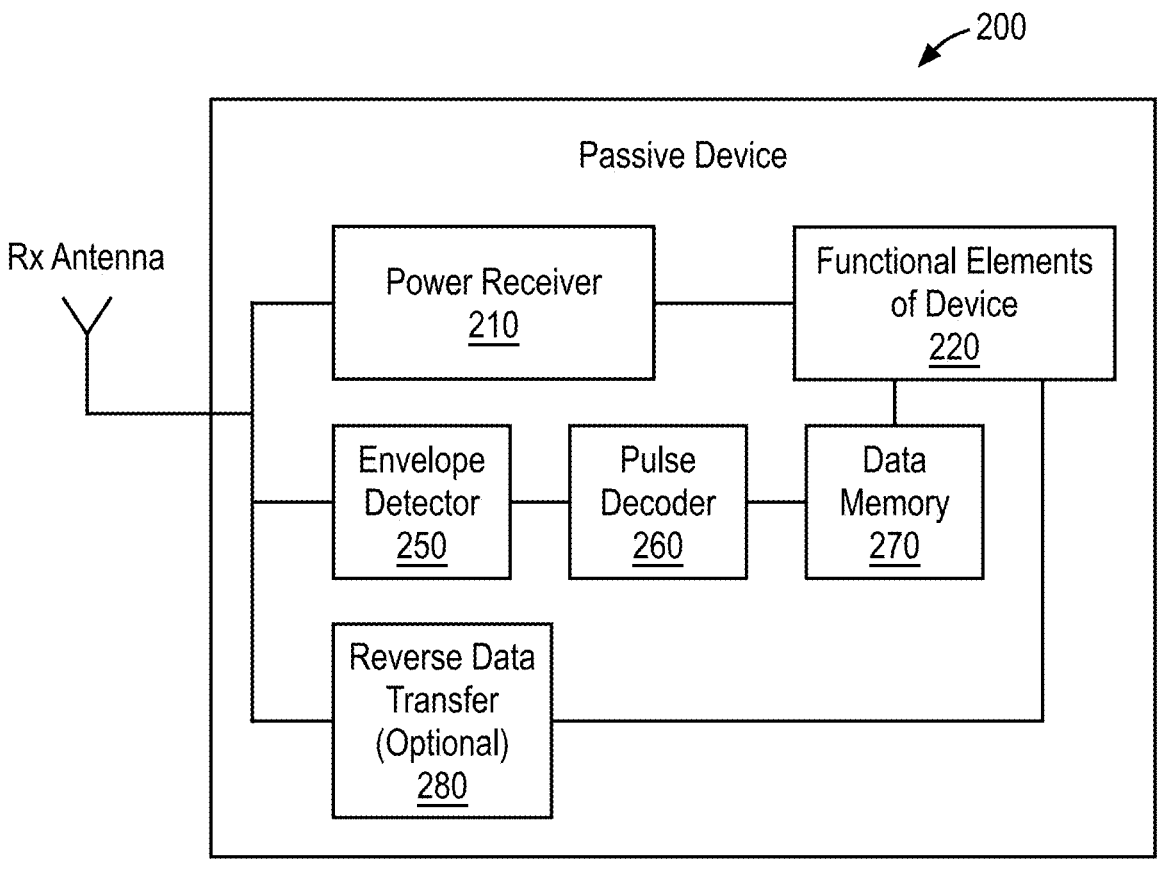
FIG. 2*a* illustrates a high level diagram of a receiver disposed within the implantable device according to one embodiment.
Figure 2B:
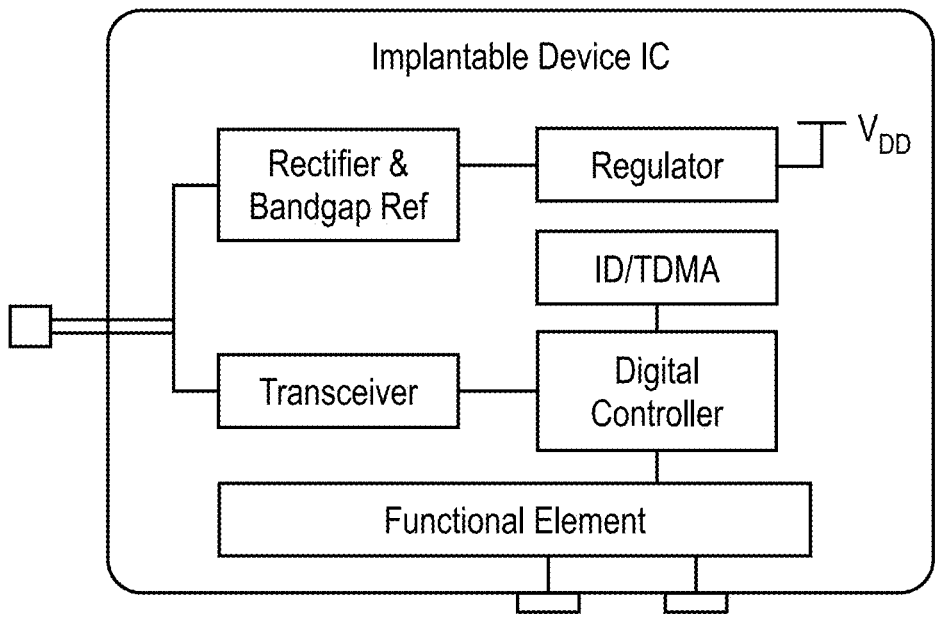
FIG. 2*b* illustrates a receiver disposed within the implantable device with an ID block for multi-access when several devices are used

High-level diagrams of the transmitter 100 and the receiving device 200 are shown in FIGS. 1 and 2, respectively. The transmitter 100 operates with a carrier generated at the desired frequency by the carrier generator 110, which is then modulated with data using the modulator 120 and the methods described herein, and is finally amplified by amplifier 130 to the desired level before being transmitted via the transmit (Tx) antenna 140. The receiving device 200 shown in FIG. 2, preferably batteryless (or synonymously referred to from hereon as passive devices), collects the power required for operation from the carrier signal using power receiver 210, and it receives data encoded in the envelope of the carrier using envelope detector 250 and pulse decoder 260. This data can be used to directly control the functional elements 220 or it can be stored in memory 270, for later use by the functional elements 220. In the case of biomedical implants, the functional components of the implanted device can range from a drug delivery system to diagnostic sensors, and these elements can, if desired, send information back to the transmitter through the optional reverse link 280, which is described in more detail in the following sections. For the optional reverse link, the external reader would need to be more similar to FIG. 1b, wherein demodulator is included for reverse data link receiving. For other applications, these functional elements could include RFID components or any other passive system that makes use of wireless powering and data transfer. Other systems that utilize some form of energy storage could also utilize these methods of communication or some a modified form of them.

Figure 3A:
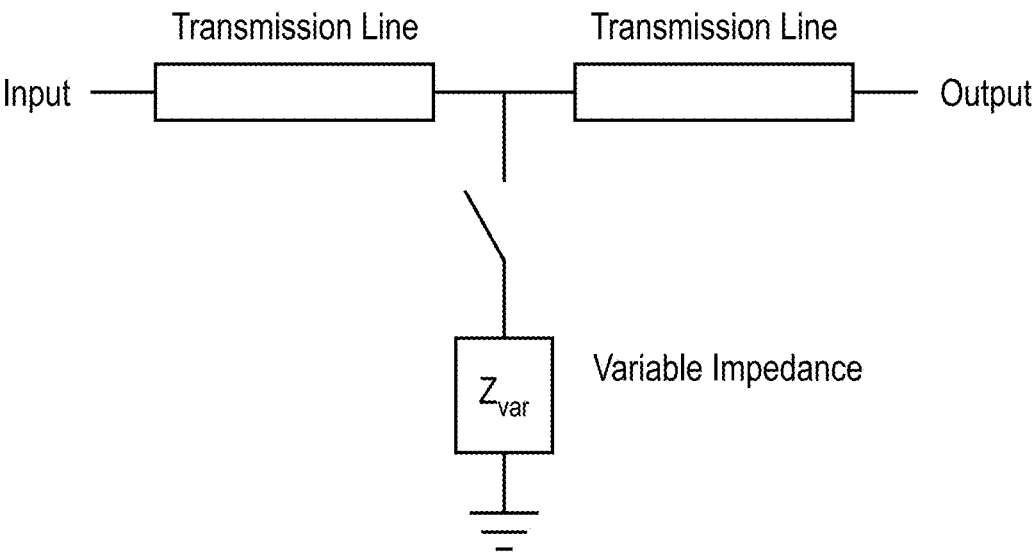
FIG. 3*a* illustrates the usage of amplitude shift keying with information encoded using pulse width modulation according to an embodiment.
Figure 3B:
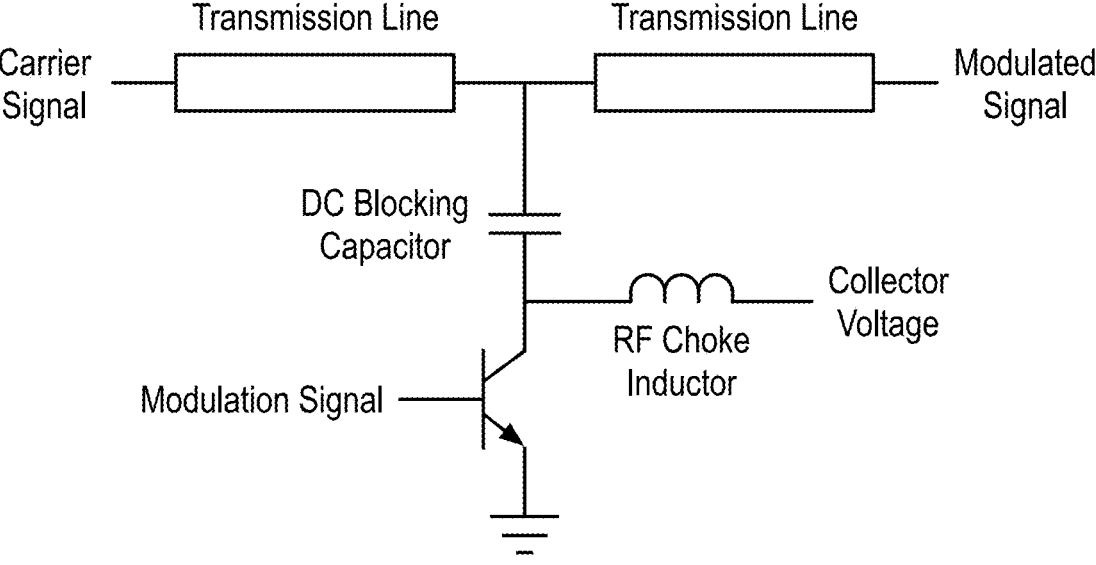
FIG. 3*b* illustrates an embodiment of a high frequency ASK modulator with variable modulation depth using a bipolar transistor

At the transmitter 100, the carrier can be generated with any number of techniques, and many conventional components can be used for most frequency ranges of interest. Amplitude shift keying with information encoded using pulse width modulation also has many possible implementations, and one potential method is shown in FIG. 3a. With this implementation, the amplitude is modulated by switching in a variable impedance that creates mismatch, which reduces the amplitude of the transmitted signal. By adjusting this impedance, the resulting amplitude can be controlled. The width of the pulses is controlled by the length of time that the impedance is switched on. At frequencies in the GHz range, it can be challenging to precisely control the load impedance. A specific embodiment of this method is shown in FIG. 3b. The bipolar transistor in this circuit simultaneously acts as the switch and the adjustable impedance. The impedance is controlled by adjusting the voltage at the collector of the BJT, the modulation signal is fed to the base, and the emitter is tied to ground. This implementation allows for high-speed modulation of high frequency signals with a precisely controlled modulation depth. Following this modulator, the signal is amplified to desired power level for the intended application. A discussion of choice of carrier frequency and power levels for different ranges and devices is given in later sections.

On the preferably passive device, the incoming signal is passed to a power receiver, which creates a stable power supply for the device. In one embodiment, this power received consists of rectification, reference generation, and regulation circuitry, all of which have many implementations. The envelope of the incoming signal is also recovered and passed to a pulse detector which decodes the data.

Figure 4A:
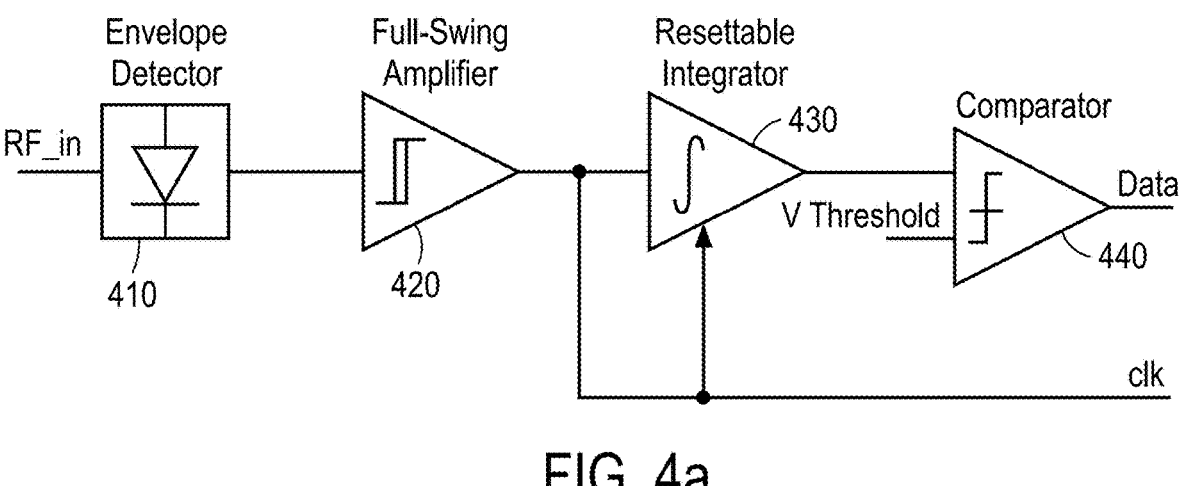
FIG. 4*a* illustrates an envelope detector and pulse detector according to one embodiment.
Figure 4B:
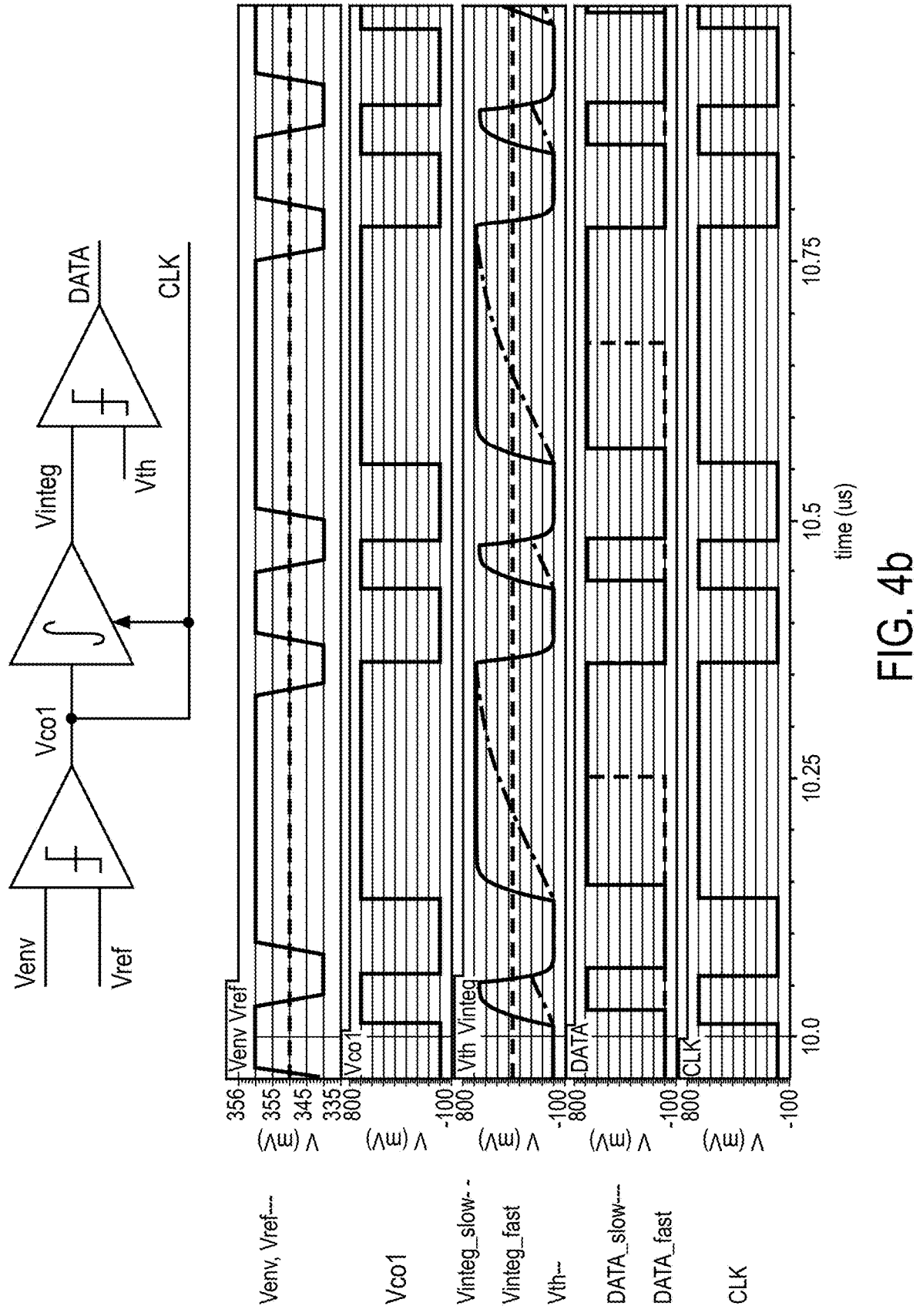
FIG. 4*b* illustrates a timing diagram showing operation of the envelope detector and pulse detector shown in FIG. 4*a;*

An implementation of the envelope detector 250 and pulse detector 260 is shown in FIG. 4a, with a timing diagram showing operation in FIG. 4b. In this method, the envelope is recovered with rectification circuitry and converted to a digital signal. This digital signal is then integrated, and the integrated result is compared to a threshold. For long pulses, the integrated result will cross the threshold, and for short pulses the integrated result will not cross the threshold. In this way, the data is recovered and can be stored in some form of memory if necessary or processed as need may be.

With specific reference to FIG. 4b, the envelope and its average, are fed to the comparator which also acts as an amplifier that outputs full-swing digital levels. First comparator output is buffered to produce CLK signal for the rest of the circuitry. Since data is encoded in pulse duration, first comparator output is integrated and long pulse durations cause integrator output to cross the fixed threshold and the second comparator outputs a digital "1". Short pulses do not provide enough time for integrator to cross the threshold and thus results in a digital "0", as can be seen in the diagram. The data can be latched by the falling edge of the clock.

This method can operate with minimal modulation depth if the threshold is set as an average of the envelope. This modulation depth can be arbitrarily low as long as the envelope can be extracted, and the preferred-reduction of the transmitted envelope is in the range of 15-20% during periods when forward link data is being transmitted. Since the periods during which forward link data is being transmitted will vary depending on application, in many instances the overall power loss will be minimal. With this averaging circuit, which in one embodiment is an RC low pass filter attached to an envelope detector, the detector could operate at arbitrary modulation depths. Also, the full-swing amplifier in FIG. 4 could be removed, but there would be additional constraints on the maximum and minimum envelope amplitudes, digital logic thresholds, and supply voltage. Alternatively, the RF envelope could be amplified by low noise amplifier (LNA), implementation of which should be known to one familiar with this art, to increase the sensitivity prior to integration and clock recovery.

Figure 5A:
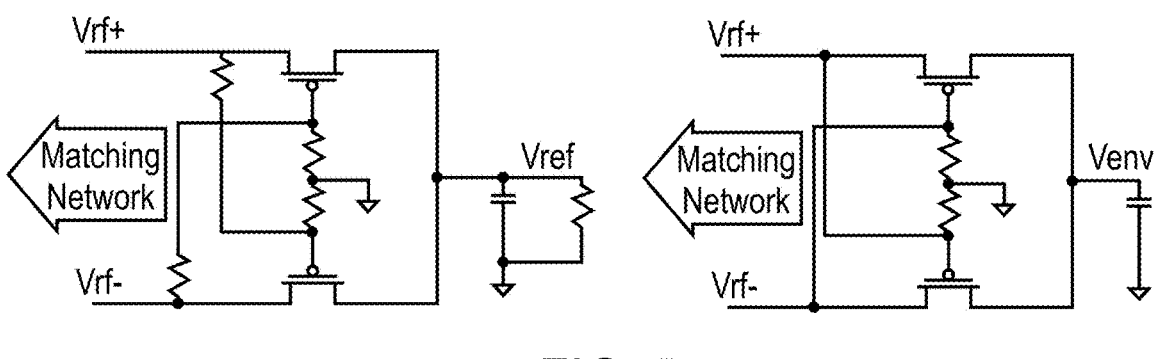
FIGS. 5(*a*)-(*c*) illustrate specific implementation of a receiver, resulting waveforms, and the general form of amplitude modulation equations and definition of modulation depth.
Figure 5B:
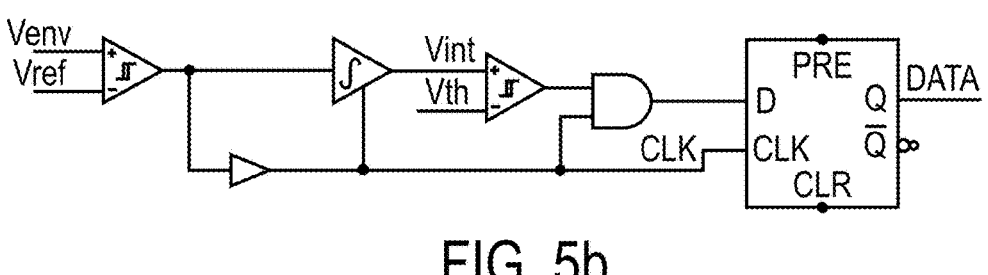
Figure 5C:
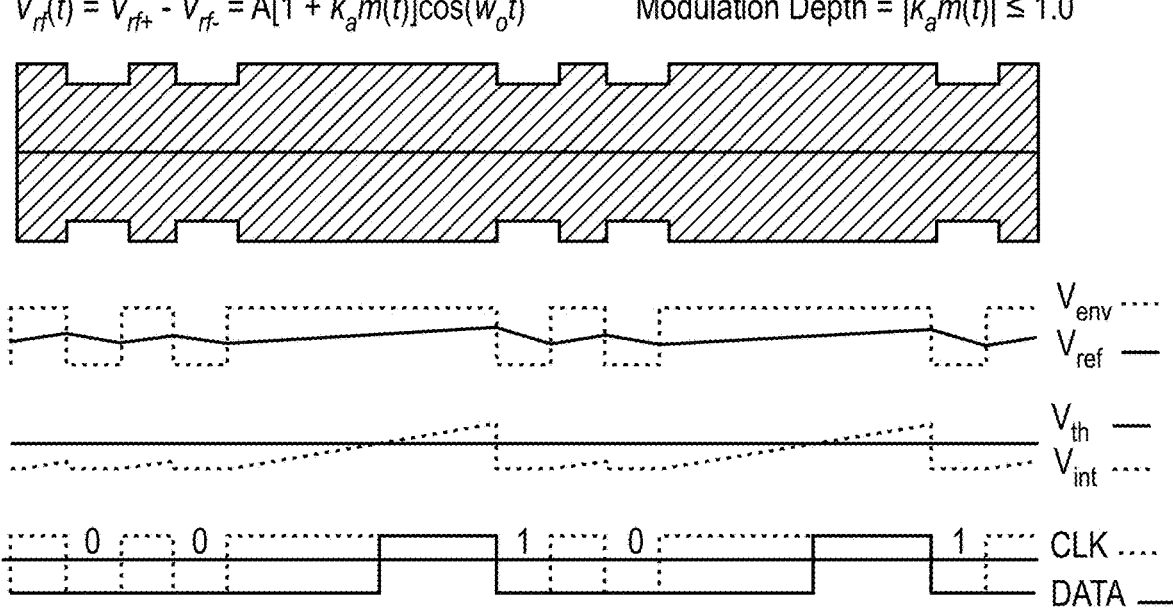
Figure 6:
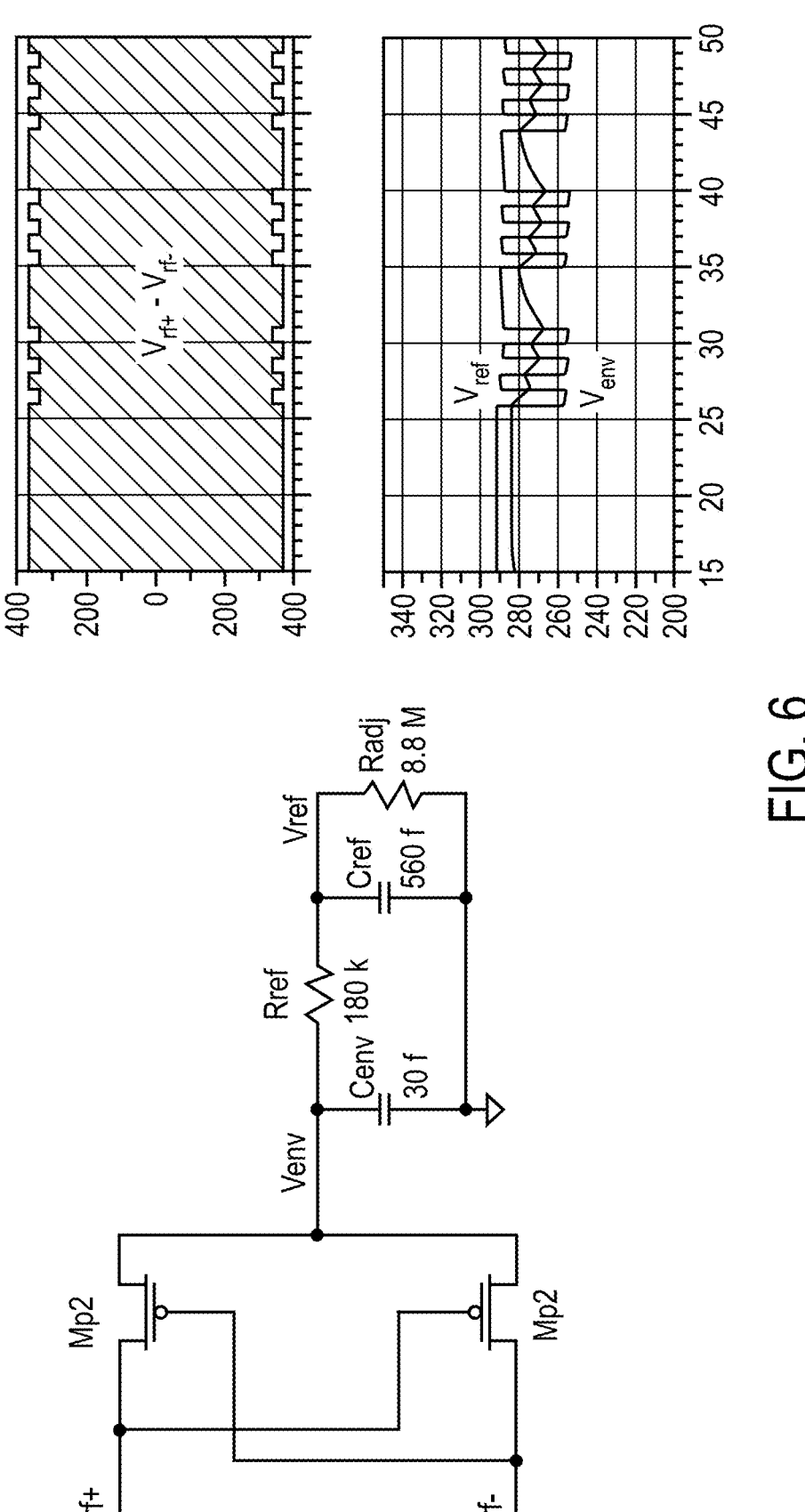
FIG. 6 illustrates the operation of the dynamic reference generator.

With respect to this specific implementation, an envelope detector 410 is directly connected to a receiving antenna, not shown, and the impedance matching network, which could be optional, (shown in FIG. 5 below). In addition to extracting the envelope of the radio frequency (RF) carrier, the envelope detector 410 may also detect the average value with a dynamic reference generator as shown in FIG. 6. In this embodiment of FIG. 6, the envelope signal and reference signal are generated with RC filters of different time constants. This particular envelope detector has a faster time constant to track variations in the RF amplitude, and the dynamic reference has a slower time constant to average the envelope.

The same RF carrier signal is passed to the power receiver 210 shown in FIG. 1 and the envelope detector 410 shown in FIG. 4, and they essentially operate independently. However, the matching network at the receive antenna has to be designed for the total load impedance, to which both of these systems contribute. For most practical applications, this impedance is dominated by the power receiver 210 shown in FIG. 1, and so very little power is wasted on envelope detector 410 shown in FIG. 4, though it is important to consider this in the design and minimize wasted power.

The envelope is compared to its average and the resulting waveform is amplified, using a full-swing amplifier 420, to a full-swing digital signal. The transitions (zero-crossings) of the envelope with its average are the basis for the obtained clock that will be used to latch the data in. The resulting waveform is fed to a resettable integrator 430. The integrator 430 starts integrating when the envelope rises above its average and stops integrating when the envelope falls below the average. The output of the integrator 430 is fed to a comparator 440 which compares the integrated value to a reference voltage. The duration of integration determines whether a logical "0" or "1" will be received. Longer pulses will result in an output of logical "1" whereas shorter pulses will be interpreted as logical "0". A more detailed implementation of a receiver is shown in FIGS. 5(*a*) and (*b*) and resulting waveforms are shown in FIG. 5(*c*). Additionally, FIG. 5(*c*) shows general form of amplitude modulation equations and definition of modulation depth.

The modulation depth can be chosen arbitrarily low and can be as high as 100%, as in the case of on-off keying (OOK). The pulse width encoding can also be an arbitrarily long duration for logical "1" and short duration for logical "0" or vice versa. Also, the actual duration of high and low amplitudes is arbitrary and sets the data rate of the data transmission. The receiver can accommodate different data rates chosen by configuring its integration time constants (integrator gain) and thus by changing the slope of the integrated waveform, or by changing the threshold voltage to the following comparator. Thus, the data rate can be made variable and adjustable depending on the required application, and the implantable device can accommodate such different data rates. In a preferred embodiment, the implantable device has several different RC time constants from which one can be selected and/or changed, thereby allowing modification after the implantable device is in the body. This selection can be made by appropriately programming a controller within the functional elements of the device block 220 shown in FIG. 2, when appropriate data is received, to make the change to the time constant. The controller switches in or out additional capacitive loading for the integrator, which is implemented using a skewed inverter, thereby changing the time constant or gain of the integrator. To ensure correct data rate after power on reset (POR) of the controller, the default data rate is selected, which is known by the external transmitter. The derived clock can also be either constant period by adjusting the duty cycle of the PW modulated data or non-constant period by modulating only the high or low RF amplitude and not keeping the total pulse width constant. The receiver circuitry, including the envelope detector and its averaging circuitry, the comparators and integrator can be implemented in many different ways.

With respect to the forward data link created by the transmitter 100 shown in FIG. 1 and received at the receiving device 200, other modifications can also be advantageous.

Firstly, multi-level encoding, which allows for the transfer of bits or symbols representing multiple bits of information, can be provided. Symbols can be encoded in pulse durations, pulse amplitude, pulse timings, or any combination of these.

Figure 7:
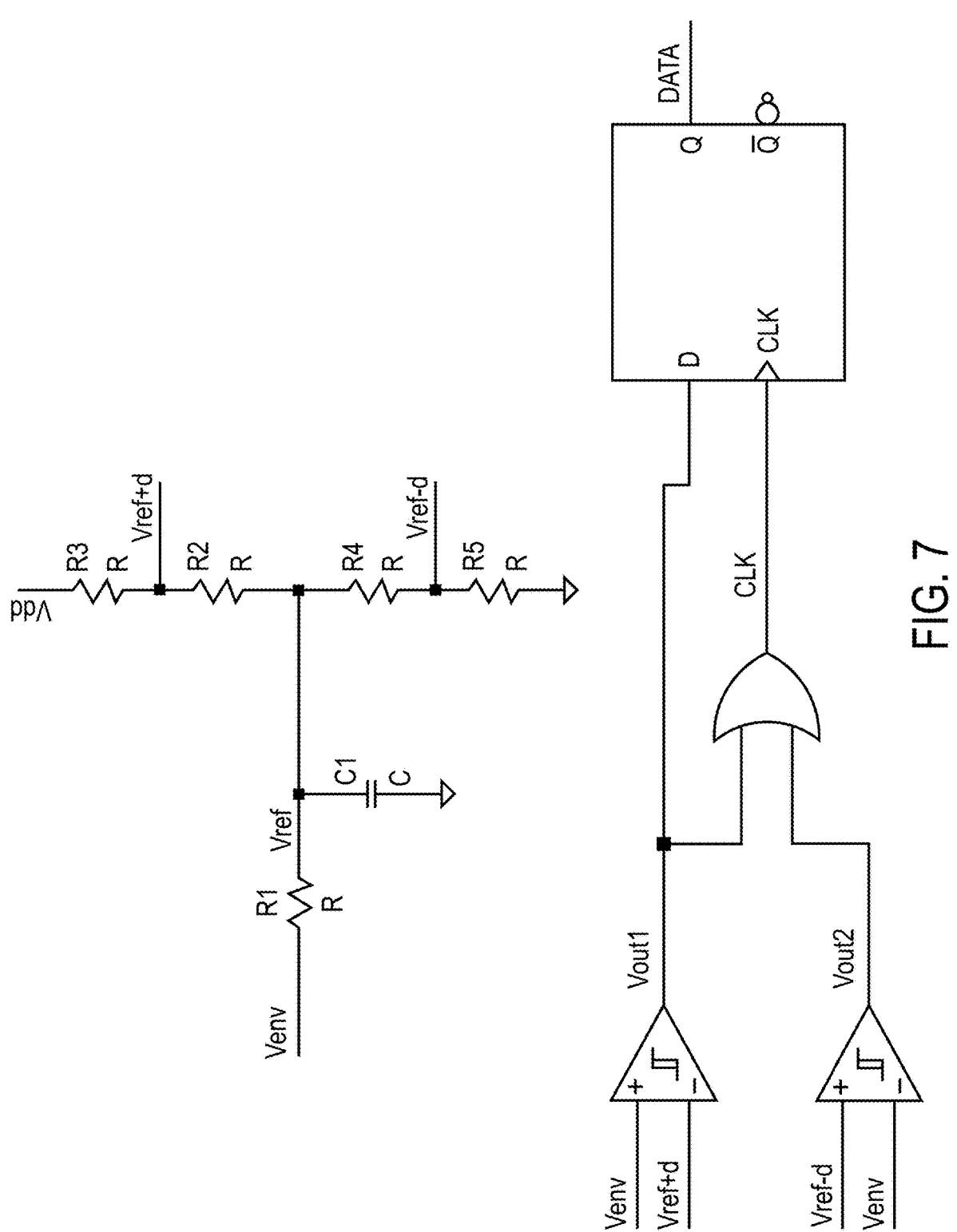
FIG. 7 illustrates one implementation of a multi-level decoding circuit.

In one embodiment, instead of encoding digital "0" and "1" into pulse width duration followed by negative transition, digital "0" and digital "1" can be encoded into negative and positive envelope transitions of equal pulse duration. This allows for constant period clock transmission and thus training of a PLL if one is required for an on-chip clock without use of preamble (which clock is being used to control and/or synchronize with circuits and signals other than the asynchronous data that is decoded from the RF carrier signal. With this multi-level encoding, each bit has equal duration resulting in a constant data rate. Pulses for each bit can be arbitrarily short and both "0" and "1" takes equal amount of time to transmit, and this eases decoding because the dynamic reference setting becomes a simple averaging of the envelope and thus simplifies threshold detection. An additional advantage is that average envelope becomes constant for equal probability of "0"s and "1"s transmitted and thus average power transferred is also constant, making it easier to estimate how much power is being transmitted for SAR or other regulations compliance A specific implementation of a multi-level decoding circuit is illustrated in FIG. 7. RC filter can be used to average the envelope and obtain reference voltage $V_{refm}$. A resistive divider can then be used to shift the reference voltage down compared to original signal and obtain $V_{reflow}$. Furthermore, another resistive divider can be used to shift down the envelope waveform and obtain $V_{envlow}$. These signals can then be used to recover clock and data as described earlier.

Figure 8:
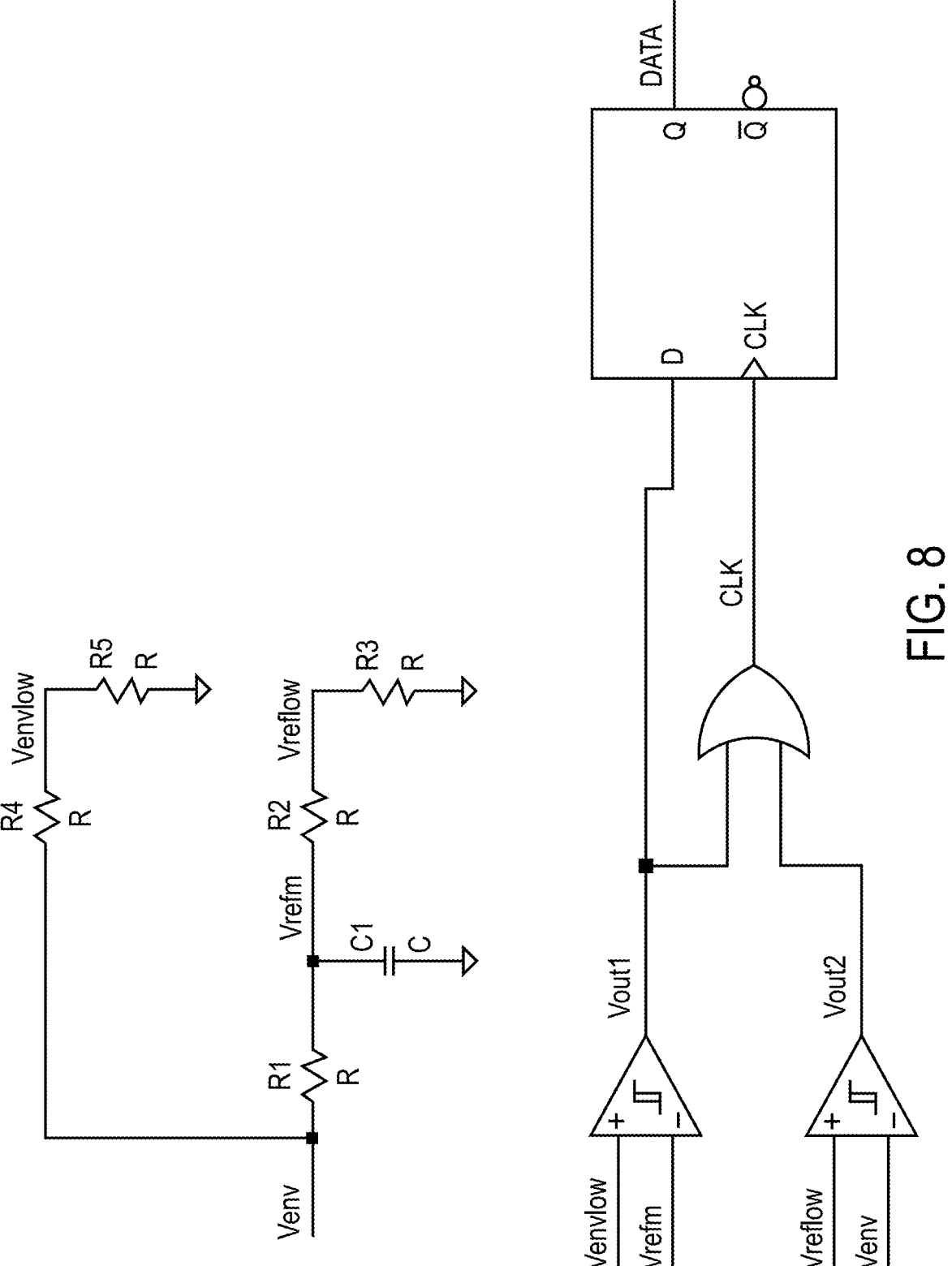
FIG. 8. illustrates another implementation of a multi-level decoding circuit.

Another implementation of a multi-level decoding circuit is illustrated in FIG. 8. Another way to generate necessary voltages from the envelope $V_{env}$ is to use RC low pass filter again to obtain average of the envelope $V_{ref}$. Further, two resistors can be tied in series to a higher potential than $V_{ref}$, such as supply voltage $V_{ad}$ and output taken from the middle of the two as shown in figure to obtain $V_{ref+d}$ voltage. Similarly, in order to obtain $V_{ref-d}$ voltage, two resistors in series can be tied to a lower potential than $V_{ref}$, such as chip ground and output can be taken from the middle to obtain $V_{ref-d}$ voltage, as can be seen in figure. These signals can then be used to recover clock and data as per earlier description and as can be seen in the figures.

Another embodiment uses frequency modulation rather than amplitude phase shift keying. In this embodiment frequency shifting can be used, which advantageously does not perturb the amplitude of the RF carrier signal, but which does require additional matching and/or filtering circuitry and the like in order to decode the frequency encoded data signal, which circuitry can be complex and consume substantial power. For frequency modulation on the transmitter side, two frequency generators which represent different bits can be switched in and out as power carriers. On the demodulator side, a filter that is selective of only one of the transmitted frequencies can be employed to recover either the presence or lack of carrier and thus decoding either a digital "1" or a "0".

Configurability of the previously described embodiments of the forward data link is a significant benefit achieved by the embodiments described. Some aspects that are configurable include the carrier frequency, the modulation depth and frequency, the pulse width, the pulse amplitude, and the pulse timing. Adjusting these parameters allows for variable data rates and operation with lower or higher available power as dictated by the environment and application. Another parameter that can either be fixed or adjustable is device identification (ID) number for individual addressability, similar to device shown in FIG. 2*b*, wherein the device includes some form of ID block for multi-access for accommodation of multiple devices. In one embodiment, the ID can be implemented using re-writable non-volatile memory. In a different embodiment, the ID can be programmed using wirebonding or flip-chip configuration by utilizing different connection of ID inputs to either supply voltage (VDD) or ground.

The reverse data link 280 from the implantable device to the external reader, if used, can be implemented in many different ways ranging from complex and power intensive methods to simple and low-power solutions. A brute force solution would be a dedicated transmitter with a local oscillator that transmits data to the external reader. This approach allows for full-duplex communication at the cost of high complexity and power consumption. A lower power, more simple solution uses load modulation, which is modulation of the load impedance as seen by the antenna. Modulating this load reflects energy that can be detected by the transmit antenna or by a different receive antenna or multiple antennas disposed exterior to the body. For power-limited devices, load and backscatter modulation for the reverse link are more practical solutions. The load can be modulated by changing either the resistivity, reactivity, or some combination of the two. Depending on how the load is varied and the link transfer function between the antennas, the phase and/or amplitude of the carrier will be modulated. In particular with respect to modulation of the load, as shown in FIG. 2, the reverse data transfer block 280 may include a reverse link modulator and pulse generator, which preferably receives an encoded reverse link data stream and an internal clock of the implantable device. The reverse link modulator and pulse generator will cause variations to the load on the antenna while the RF carrier is being received without any forward link data encoded thereon. These load variations can be used to provide load shift keying backscattered modulation of the RF carrier. Depending on the particular application, how the load is modulated can be varied in dependence thereon, including prior to any device being used, or even after a device is in use. Once a device is in use, modification can be made in a similar manner to that described previously with respect to modification of the RC time constant for an implantable device previously. In one embodiment, the preferred load can be selected using a multiplexor implemented using passgates and the modulation of the load that is seen by the antenna can be done using another passgate that is connected between selected load and antenna. In one embodiment with a particular antenna, implanted devices generally performed best with capacitive loading, while devices in air generally performed better with inductive loading. Therefore, the possibility of having multiple different loads, either on-chip or off-chip, for load modulation can be beneficial for accommodation of different tissue conditions (due to different permittivity), different antennas, different encapsulations, or overall for varying environmental conditions. These different loads can also be selected to trade off between reflected power (which perturbs power delivery to the implant), and data signal quality which is transmitted to the external reader to ensure its readability. One such case could be to compensate for motion artifacts while a person is breathing and separation between implantable device and external antenna is changing. Also, these different loads can be used for multi-level encoding because on the external receiver side different loads would correspond to different pulses due to variation of amplitude and phase by different loads.

Figure 9:
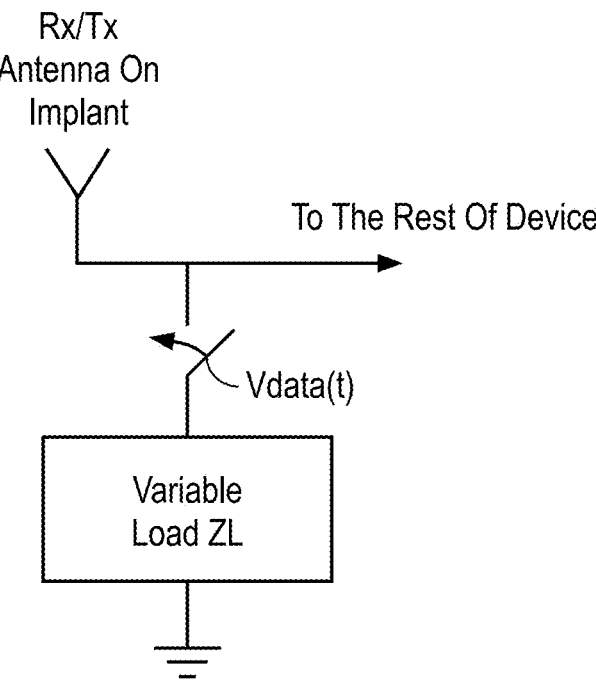
FIG. 9 illustrates a sample high-level diagram of load modulation for the reverse data link according to an embodiment.

A sample high-level diagram of load modulation for the reverse data link is shown in FIG. 9. In the figure, variable load impedance is switched on and off by the data stream on the device and produces different antenna termination for the different bits. In connection with the variable load impedance, it is advantageous to include within the reverse link data stream a preamble that the external receiver can use to allow the external receiver to decode the reverse link data stream, which, similar to the forward link, is preferably transmitted asynchronously. It is generally not optimal, however, to reflect large amounts of energy back to the external reader because it interferes with the power delivered to the device, and so in certain applications phase modulation may be advantageous, as was described in the paragraph above. Additionally, load modulation can be easily combined with continuous-time sensing and processing that was recently described by Schell and Tsividis in "A Continuous-Time ADC/DSP/DAC System With No Clock and With Activity-Dependent Power Dissipation," *Solid-State Circuits, IEEE Journal of*, vol. 43, no. 11, pp. 2472-2481 November 2008. They demonstrated a system that converts an analog waveform into a digital representation without a constant sampling interval. Not only does this eliminate the need for clock generation, but it also saves power because it does not need to sample the input signal when there is no activity. This is perfectly suitable for biological waveforms as they tend to have long periods of little or no activity. The modulator controlled by the event-driven sampling only transmits data during physiological activity and will save energy during idle periods. Since the forward link is asynchronous and does not require a clock, the event-driven sampling with load modulation is well-suited for the reverse data link as it also does not require a clock.

The range of communication with the device depends on the carrier frequency, the transmitted power, and the intended application of the device. These ranges typically vary from a millimeter to a meter, though a preferred set of ranges is carrier wavelength/100 to carrier wavelength*100. For biomedical implants, there are safety considerations with transmitting RF power into the body, and these requirements are associated with the amount of energy absorbed by the tissue. This absorption varies with frequency, and so the frequency must be carefully chosen to suit the application. Lower frequencies tend to have greater penetration through the body with less absorption, but also tend to be inefficient as implantable devices become very small due to antenna inefficiencies. High frequencies are absorbed more strongly by the tissue, but for small implants they are necessary because both the receive antennas are smaller and power transfer efficiency is higher. Different applications will also have different power requirements, and so the carrier must be chosen to accommodate the power budget for the intended purpose, which specifically include transcutaneous powering and data transfer for implantable biomedical devices body area network (BAN). For other passive devices that are not intended to be implanted such as near field communications (NFC) and radio frequency identification (RFID) tags, there is different set of considerations and limitations. The frequency and power levels can be chosen to be compatible with existing standards and regulations. Also, different privacy measures and encoding schemes can be implemented with the existing data link to make the link more robust and secure. However, the modulation and data transfer method described can operate over a wide range of frequencies and power levels, and so it should be able to robustly accommodate the different needs of these types of devices.

The preferred embodiment operates at 2 GHz (typical for small implantable devices), and RFID frequencies tend to be near 900 MHz. However, modulation at the impedance at any frequency, and recovery is straightforward, and as such, the present embodiments can operate from the kHz range to the mid-GHz range, and this choice would be made based on the application. It is noted, however, that there is a limitation at the rectifier by the switching speed of the transistors, but this is inherent to the technology. Also, the carrier frequency should be higher than the modulation frequency in order to properly receive data. This sets the lower bound for the carrier frequency if the application requires certain data rate. Alternatively, lower carrier frequencies limit the maximum data rate if the application requires a certain carrier frequency.

The typical lengths/powers are also set by the specific application, and this data transmission method could be applied for these applications with minimal impact on power transfer. Implantable devices tend to be shorter range because the tissue absorbs so much power, while RFID systems can be longer range because they transmit through air. The exact choice of frequency depends on many things and influences the size of the device, distance (depending on transmission medium), and the resulting efficiency of the transfer. It also must comply with the regulations associated with the frequency band, which can force devices to operate in certain ranges. These can be determined based upon the teachings described herein.

In a specific configuration that uses as the functional device elements 220 illustrated in FIG. 2 a controller to receive the forward link data, auxiliary circuits controlled by the controller, and also a PLL that provides a clock used by the controller and other auxiliary circuits, and in which the controller can also optionally configure the reverse link data stream, the forward link data provided can preferably include both clock data and other circuit data. In this configuration, training the PLL can occur using the clock data that is transmitted, and other circuit data can then be provided for use by the controller, which controller is then more functional given the PLL having been trained. Training of the PLL can be done once or periodically as the delivered power to the implant, aging of the device, drift, and other conditions can cause the on-chip clock to deviate from its trained clock period. Therefore, each forward data stream can be potentially used to retrain the PLL if there may be a need for this. This also allows for the implantable device not to have a crystal oscillator or any other sort of precision clock generation which can be expensive, power hungry, or bulky. The external transceiver can have these components due to fewer restrictions on power budget, size, weight, and price.

In use, the implantable device can be packaged with epoxies, plastics, or other materials that cover the receive antenna and isolate circuitry both physically and electrically, though it should be transparent at the frequency of operation for the best performance. These epoxies are readily available and there are even bio-compatible versions. While there will be some minimal loss through this material, for most applications it is insignificant, especially when transmitting through tissue.

Although the embodiments have been particularly described with reference to embodiments thereof, it should be readily apparent to those of ordinary skill in the art that various changes, modifications and substitutes are intended within the form and details thereof, without departing from the spirit and scope intended. Accordingly, it will be appreciated that in numerous instances some features will be employed without a corresponding use of other features. Further, those skilled in the art will understand that variations can be made in the number and arrangement of components illustrated in the above figures.

What is claimed is:

1. An apparatus for wireless transmission of data and power to a location within a body that causes varying transmission characteristics, the apparatus comprising:
    a forward link transmitter located exterior of the body the forward link transmitter configured to perform the steps of:
    providing a single signal, the single signal including a RF carrier and data symbols encoded in at least some pulses on the RF carrier; and
    directing the single signal toward the implantable device disposed within the body; and
    one or more implantable devices, which when disposed at the location are configured to perform the steps of:
    receiving the single signal; and
    processing the single signal, the processing including:
        collecting power required for operation of the implantable device from the RF carrier of the single signal; and
        recovering the data symbols encoded on the RF carrier, wherein the recovering occurs without synchronizing to the RF carrier;
wherein data symbols are encoded in pulse durations, pulse amplitudes, and/or pulse timings on the RF carrier.

2. The apparatus according to claim 1 wherein during the step of directing, a distance between a forward link transmitter and the implantable device is in the range of carrier wavelength/100 to carrier wavelength*100.

3. The apparatus according to claim 1, wherein the forward link transmitter is configured to change the pulse width, amplitude, and/or timing of the pulses encoded on the RF carrier.

4. The apparatus according to claim 1, wherein the implantable device includes:
    a rectifier that is configured to collect the power required for operation; and
    an envelope detector to asynchronously recover the pulses encoded on the RF carrier.

5. The apparatus according to claim 1, wherein implantable device comprises functional elements, and the data encoded on the signal is used to control the functional elements.

6. The apparatus according to claim 1, wherein implantable device comprises an antenna and is further configured send data to the external device by encoding data on the signal by modulating the impedance of a load seen by the antenna.

7. The apparatus according to claim 1, wherein the step of collecting power required for operation recovers power from at least some of the pulses on the RF carrier.

8. The apparatus according to claim 7, wherein the forward link transmitter is configured to change the pulse width, amplitude, and/or timing of the pulses encoded on the RF carrier.

9. The apparatus according to claim 7, wherein the implantable device includes:
    a rectifier that is configured to collect the power required for operation; and
    an envelope detector to asynchronously recover the pulses encoded on the RF carrier.

10. The apparatus according to claim 7, wherein implantable device comprises functional elements, and the data encoded on the signal is used to control the functional elements.

11. The apparatus according to claim 7, wherein implantable device comprises an antenna and is further configured send data to the external device by encoding data on the signal by modulating the impedance of a load seen by the antenna.

* * * * *